Feb. 22, 1938.　　　H. H. KING　　　2,109,426
PLANT PROTECTOR
Original Filed June 5, 1934　　2 Sheets-Sheet 1
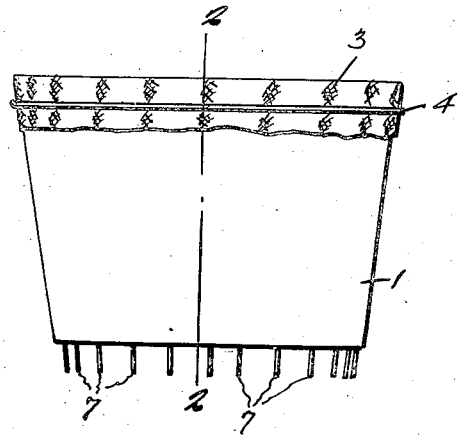
Fig. 1.
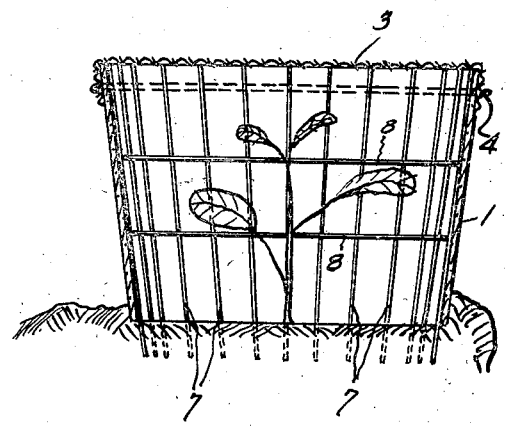
Fig. 2.
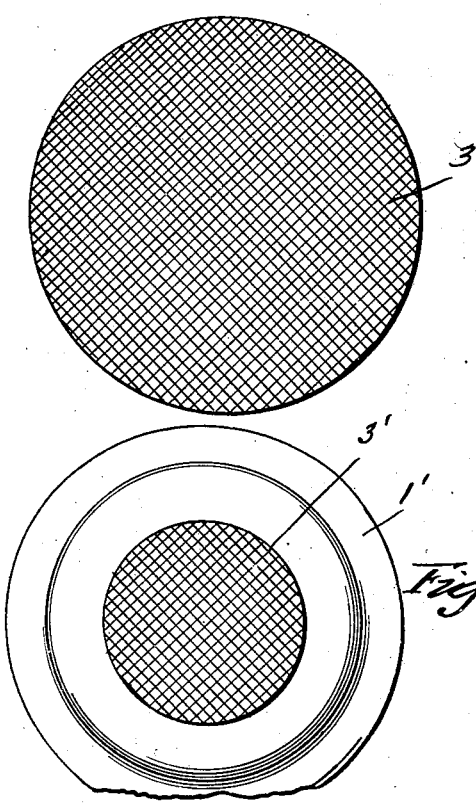
Fig. 3
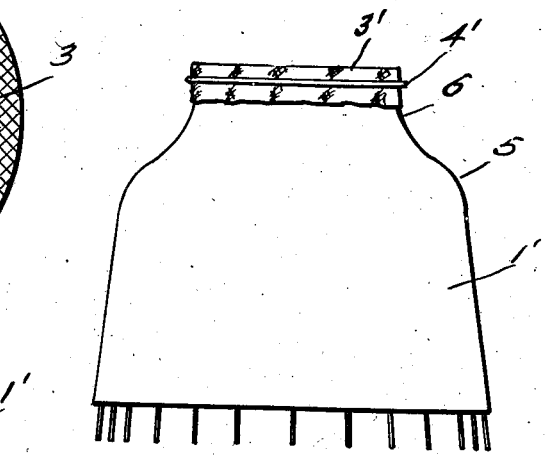
Fig. 4.
Fig. 5.
Inventor
H. H. King
By Clarence A. O'Brien
Attorney Feb. 22, 1938. H. H. KING 2,109,426
PLANT PROTECTOR
Original Filed June 5. 1934 2 Sheets-Sheet 2
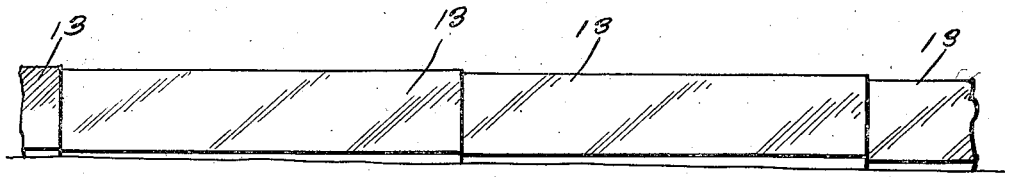
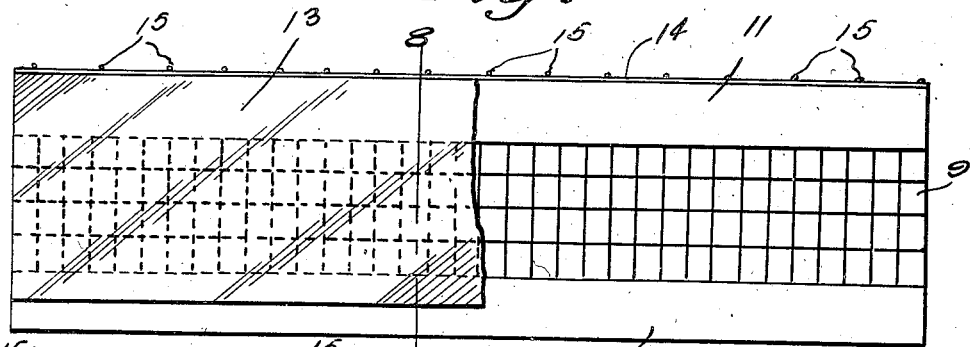
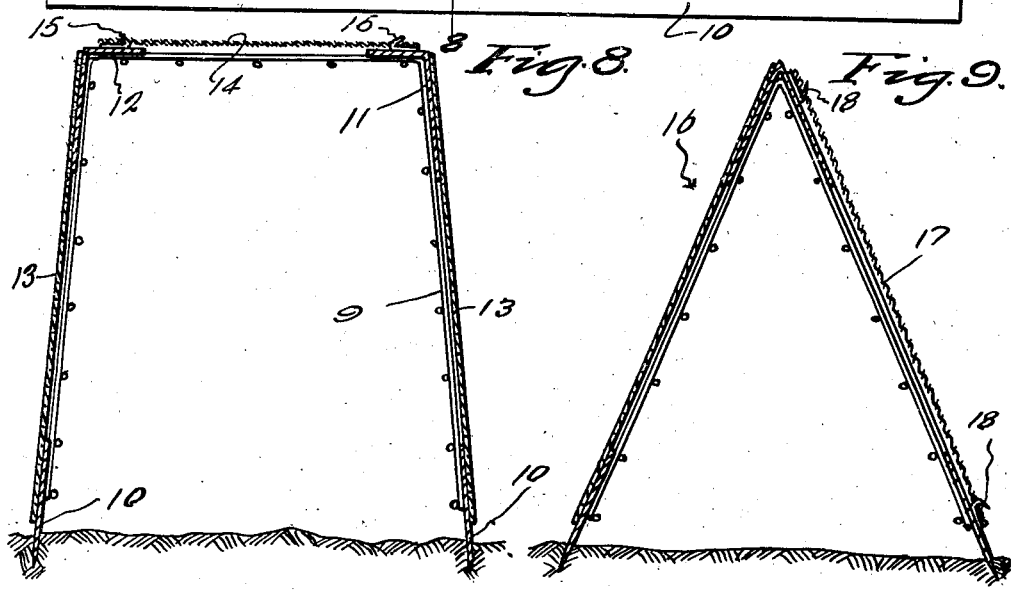
Inventor
H. H. King
By Clarence A. O'Brien
Attorney Patented Feb. 22, 1938

2,109,426

UNITED STATES PATENT OFFICE 2,109,426

PLANT PROTECTOR

Henry Hansal King, West Palm Beach, Fla.

Refiled for abandoned application Serial No. 729,141, June 5, 1934. This application June 25, 1936, Serial No. 87,327. Renewed September 8, 1937

5 Claims. (Cl. 47—28)

This invention relates to a plant protector, the general object of the invention being to provide a body member formed of transparent material and having its bottom open so that the member can be placed around a plant, with a covering of cheesecloth or the like for the upper end of the body member, whereby the plant is protected from frost, heavy rains, hail and winds.

Another object of the invention is to so form the body member that a number of them can be nested together so that they can be easily transported from place to place and will occupy but little space when stored.

Another object of the invention is to provide means whereby a number of the devices can be placed together in a row to cover a row of plants.

This invention also consists in certain other features of construction and in the combination and arrangement of the several parts, to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is an elevation of one form of the invention.

Figure 2 is a section on line 2—2 of Figure 1, and showing the device in use.

Figure 3 is a top plan view.

Figure 4 is an elevation showing a modified form of the invention.

Figure 5 is a top plan view of this form of the invention.

Figure 6 is a view showing a number of elongated members placed together to cover a row of plants.

Figure 7 is an elevation, with parts in section, showing one of these elongated members.

Figure 8 is a section on line 8—8 of Figure 7.

Figure 9 is a transverse sectional view through a further modification.

Referring to Figures 1, 2, and 3, the numeral 1 indicates the body of the device which is formed of glass, celluloid or other transparent material and has both ends open and the device tapers downwardly so that a number of the members can be nested together to facilitate transportation and storage. The device is placed over a plant, as shown in Figure 2, with its lower end partly extending into the hill of dirt in which the plant grows and the top of the member is closed by a sheet 3 of cheesecloth, canvas or the like. This sheet has its edges overlapping the upper end of the member and is held in place by a band or string 4 of any suitable material.

In that form of the invention shown in Figures 4 and 5, the body member 1' tapers upwardly from its lower end and then curves inwardly, as shown at 5, and from this curved portion, the upper part of the body member tapers upwardly, as shown at 6. The cover 3' encloses the small upper end of the device and is held in place by the band or string 4'.

It will be seen that in both forms of the device, a number of the devices can be nested together so that transportation and storage are facilitated, and that when the device is in use, as shown in Figure 2, the rays of the sun can pass through the body member to act upon the plant or the seeds and the device, with its cover, will protect the plant from frost, hard rains, wind and hail, so that the seeds or plants can be planted much earlier than when the devices are not used, which results in an earlier crop. Frost collecting on the cover will be melted by the sun rays and the resultant moisture will drop into the dirt at the bottom of the device and heavy rain will be formed into a mist by the cover member and thus this mist will moisten the ground covered by the device. The cover member also permits a sufficient amount of air to pass to the plant to enable it to grow.

Wherever necessary or desired, a wire frame may be used to support the member 1, this frame including the longitudinal wires 7 and the ring-shaped wires 8, the lower ends of the wires 7 projecting beyond the lower end of the member 1 so that they will extend into the ground and thus help to hold the device in place.

Figures 7 and 8 show another form of the invention, which is of elongated form and is composed of the U-shaped frame 9 formed of wire mesh and having the metal strips 10 connected to the lower ends of the limbs thereof, with the strips projecting beyond the frame, so that these strips can penetrate the ground, as shown in Figure 8, and other metal strips 11 are connected to the upper ends of the limbs while strips 12 are connected to the edges of the top part of the frame. If desired, these parts 12 may be formed integral with the parts 11 and bent over the top of the frame, as shown. Sheets 13 of transparent material cover the sides of the device and if these sheets are of celluloid or the like, they may be cemented or otherwise attached to the strips 10 and 11, or if they are of glass, they can be held in place by small hooks or the like struck from the strips. A fabric cover 14 covers the top of the device and is held in place by the small hooks 15 connected with the strips 12.

Figure 9 shows another modification in which the frame and the parts attached thereto form an inverted V-shaped member 16 and either in this form of the device or that shown in Figures 7 and 8, one side of the frame may be covered with fabric, as shown at 17 in Figure 9, which is connected with the metal strips by the hooks 18, while the other side is covered by a transparent member. Thus the cold side of the device can be covered by a transparent member, while the side which is not exposed to the winds, but is exposed to the sun, can be covered by a fabric. The device shown in Figure 8 or that shown in Figure 9, slightly tapers from one end to the other so that the small end of one device will fit in the large end of the other device, as shown in Figure 6, so that a plurality of the devices can be used to cover an entire row of plants.

With the invention shown in Figures 6, 7, 8, and 9, the ends of the devices placed in a row can be closed in any suitable manner and if desired, a hole can be dug in the dirt and a lamp or small stove placed therein, so that the heat produced will be retained in the row of devices and thus the device will act as a small hothouse. As will be seen, the frame composed of the wires 7 and 8 shown in Figures 1, 2, and 4, and the U-shaped frame 9 shown in Figures 7 and 8, and composed of the wire mesh and metal strips, both constitute an openwork frame for supporting the covering material and permitting air to reach the plants covered by the device, when such material is porous.

What is claimed is:—

1. A plant protector comprising a wire frame of substantially inverted U-shape, metal strips connected to the lower ends of the frame for penetrating the ground, metal strips connected to the upper corners of the frame, transparent sheets connected to the strips and covering the sides of the frame, and fabric covering the top of the frame and connected with the metal strips.

2. A plant protector comprising a wire frame of substantially inverted U-shape, metal strips connected to the lower ends of the frame for penetrating the ground, metal strips connected to the upper corners of the frame, transparent sheets connected to the strips and covering the sides of the frame, fabric covering the top of the frame and connected with the metal strips, said device tapering from one end to the other whereby a number of devices can be placed in a row with their ends telescoping.

3. A plant protector comprising a body member formed of an openwork frame having a substantially flat top, transparent material on the sides of the frame terminating short of the lower end of the frame, whereby said lower end of the frame may be forced into the ground and porous fabric covering the upper end of the body for permitting moisture to enter the body while preventing frost and heavy rain from injuring the plants covered by the protector.

4. A plant protector comprising a body member having its sides formed of transparent material and said member having a flat top formed of porous material, whereby moisture can enter the top of the frame but frost and heavy rain are prevented from injuring the plant covered by the protector and an openwork frame reinforcing the body member and having its ends projecting from the bottom thereof, whereby the lower end of the frame can be forced into the ground.

5. A plant protector comprising a wire frame having a substantially flat top, a metal strip connected to the lower end of the frame, a metal strip connected to the top of the frame, transparent material connected to the side walls of the frame and terminating short of the lower edge of the lower strip and porous material covering the top of the frame.

HENRY HANSAL KING.